United States Patent
Joshi et al.

(10) Patent No.: US 6,745,344 B1
(45) Date of Patent: Jun. 1, 2004

(54) DEBUG AND DATA COLLECTION MECHANISM UTILIZING A DIFFERENCE IN DATABASE STATE BY USING CONSECUTIVE SNAPSHOTS OF THE DATABASE STATE

(75) Inventors: Vikram Joshi, Los Gatos, CA (US); Alex Tsukerman, Foster City, CA (US); Shari Yamaguchi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 513 days.

(21) Appl. No.: 09/717,161

(22) Filed: Nov. 20, 2000

Related U.S. Application Data
(60) Provisional application No. 60/166,598, filed on Nov. 19, 1999.

(51) Int. Cl.[7] .................................................. G06F 11/00
(52) U.S. Cl. .............................. 714/38; 717/4; 707/203
(58) Field of Search .............................. 714/38, 39, 42, 714/47, 48, 26, 45; 717/4, 124, 125, 8, 9, 128; 707/203, 205

(56) References Cited

U.S. PATENT DOCUMENTS

| | | | |
|---|---|---|---|
| 5,303,379 A | | 4/1994 | Khoyi et al. |
| 6,085,029 A | * | 7/2000 | Kolawa et al. ............... 714/38 |
| 6,163,858 A | * | 12/2000 | Bodamer ...................... 714/34 |
| 6,167,535 A | * | 12/2000 | Foote et al. ................... 714/38 |
| 6,226,787 B1 | * | 5/2001 | Serra et al. .................. 717/125 |
| 6,378,124 B1 | * | 4/2002 | Bates et al. ................. 717/129 |
| 6,412,106 B1 | * | 6/2002 | Leask et al. ................ 717/124 |
| 6,442,748 B1 | | 8/2002 | Bowman-Amuah |
| 6,542,844 B1 | * | 4/2003 | Hanna ......................... 702/120 |

OTHER PUBLICATIONS

"Solaris 2.6 Reference Manual AnswerBook>> man Pages(3): Library Routines", 5 pages, 2001, http://docs.sun.com:80/ab2/@LegacyPageView?toc=SUNWab_40_4%3A%2Fsafedir%2Fsp.

* cited by examiner

*Primary Examiner*—Nadeem Iqbal
(74) *Attorney, Agent, or Firm*—Hickman Palermo Truong & Becker LLP; Edward A. Becker

(57) ABSTRACT

A method and apparatus for debugging a software program is provided. In one example, a method includes preserving consecutive snapshots of a group of shared memory structures that contain data and control information of the software, such as a database system. A first snapshot may be taken immediately prior to the occurrence of an error, and a second snapshot taken after the occurrence of the error. The consecutive snapshots are compared to each other to determine what memory structures and data are affected by the error.

18 Claims, 2 Drawing Sheets

DEBUG AND DATA COLLECTION MECHANISM UTILIZING A DIFFERENCE IN DATABASE STATE BY USING CONSECUTIVE SNAPSHOTS OF THE DATABASE STATE

CROSS REFERENCE TO RELATED APPLICATIONS

This application is related to and claims domestic priority under 35 U.S.C. §119(e) from prior U.S. Provisional Patent Application Serial No. 60/166,598 filed on Nov. 19, 1999 entitled "Debugging Techniques And Fast SGA Dumps For Deferred Analysis Of The Database", by inventors Vikram Joshi, Alex Tsukerman, and Shari Yamaguchi, the entire disclosure of which is hereby incorporated by reference as if fully set forth herein.

This application is related to U.S. patent application Ser. No. 09/649,310 filed on the Aug. 28, 2000 entitled "Method And Apparatus For Debugging A Software Program", by inventors Vikram Joshi, Alex Tsukerman, and Shari Yamaguchi (Attorney docket number 50277-377, OID 1999-173-01), the entire disclosure of which is hereby incorporated by reference as if fully set forth herein.

This application is related to U.S. patent application Ser. No. 09/717,187, filed on the same day herewith entitled "Method And Apparatus for Debugging a Software Program Using Dynamic Debug Patches and Copy on Write Views", by inventors Vikram Joshi, Alex Tsukerman, and Shari Yamaguchi, the entire disclosure of which is hereby incorporated by reference as if fully set forth herein.

This application is related to U.S. patent application Ser. No. 09/717,162, filed on the same day herewith entitled "Fast Database State Dumps to File for Deferred Analysis of a Database", by inventors Vikram Joshi, Alex Tsukerman, and Shari Yamaguchi (Attorney docket number 50277-379, OID 1999-173-03), the entire disclosure of which is hereby incorporated by reference as if fully set forth herein.

FIELD OF THE INVENTION

The present invention generally relates to debugging software programs and, re specifically, to techniques for debugging database systems.

BACKGROUND OF THE INVENTION

In a database system, an area of system memory is allocated and one or more rocesses are started to execute one or more transactions. The database server communicates ith connected user processes and performs tasks on behalf of the user. These tasks typically nclude the execution of transactions. The combination of the allocated system memory and the processes executing transactions is commonly termed a database "server" or "instance".

Like most software systems, a database server has complicated shared memory structures. A shared memory structure contains data and control information for a portion of a database system. Because of software, hardware, or firmware bugs that may exist in a complex database system, shared memory structures may become logically incorrect. When structures become logically incorrect, the database is likely to fail. Database failure is typically discovered in the following ways: by checking consistency of structures; by verifying certain assumptions; or by running into corrupted pointers. Attempting to process corrupted pointers will lead to a "crash," where normal database operation is no longer possible.

A major responsibility of the database administrator is to be prepared for the possibility of hardware, software, network, process, or system failure. When shared structures are presumed to be corrupted, the best course of action for a database administrator is to cease further processing of the database. If a failure occurs such that the operation of a database system is affected, the administrator must usually recover the database and return the database to normal operations as quickly as possible. Recovery should protect the database and associated users from unnecessary problems and avoid or reduce the possibility of having to duplicate work manually.

Recovery processes vary depending on the type of failure that occurred, the structures affected, and the type of recovery that is performed. If no files are lost or damaged, recovery may amount to no more than rebooting the database system. On the other hand, if data has been lost, recovery requires additional steps in order to put the database back into normal working order.

Once the database is recovered or rebooted, the immediate problem is quickly resolved, but because the root cause is still undetermined and therefore unresolved, the error condition may resurface, potentially causing several additional outages. Therefore, it is still important to diagnose the state of the structures and data surrounding the database failure. Such a diagnosis may provide valuable information that can reduce the chance of failure in the future. As a practical matter, diagnosing the failure may lead to determining which vendor's hardware or software is responsible for the database failure. Such information is valuable for a vendor's peace of mind, if nothing else. Thus, competing with the goal of recovering the database as quickly as possible, is the goal of determining why the database system failed in the first place.

Unfortunately, even with traditional techniques of diagnosing a database failure, the system administrator is usually unable to obtain a sufficient amount of clues to determine why the failure happened. A deliberate and thorough diagnosis of the failure may require an unacceptable amount of database downtime. For example, any amount of downtime over 30 minutes may be extremely costly for a database that is associated with a highly active web site. Too much downtime may have unduly expensive business ramifications, such as lost revenue and damage to the reputation of the web site owner.

Another problem with traditional debugging techniques is that they can be intrusive. For example, a database system that supports the Structured Query Language (SQL) may be debugged by compiling SQL statements and running against the database. The act of compiling and executing the SQL statements changes the state of the database system. Thus, the mere act of diagnosing the problem can easily make the problem worse because diagnosis may involve altering the state of the database. Diagnosing the problem typically involves using debugging software, which calls for exploration into data structures within the complex memory structures of the database systems. Although the data structures are best left untouched upon a failure, diagnosing the failure may involve working directly on the same data structures from which data is to be obtained. Nevertheless, it is important to preserve the original data and not change the data from its state at time of failure. A customer of the database may take issue to changing the database as such changing may jeopardize or even destabilize their database system.

Effective diagnosis, however, requires getting as much information as possible out of the data structures. It may be useful here to refer to Heisenberg's uncertainty principle, which effectively states that the closer an object is analyzed, the more the object materially changes because the mere act of analyzing is intrusive. Applying this principle to the act of diagnosing a database failure, a typical debugging process is naturally intrusive. Thus, it is difficult to be non-intrusive on a database and at the same time obtain a sufficient amount of meaningful data for debugging.

Traditional debugging techniques involve formatting certain parts of the database system and displaying this formatted portion in a human-readable form. This humanreadable form can be set aside for later analysis, for example, after the database has been recovered or is no longer down. The entire memory of the database server is not dumped because an average database server is very large, typically between about 200 megabytes and about 100 gigabytes of unformatted binary and data.

Unfortunately, such a debugging technique provides diagnosis only to the database server's end-memory state, which is the state after the database has been shut down. Because the end-memory state is being analyzed separately from the database, the programmer performing the debugging does not have access to the real database and some of the database's persistent structures. Some of these persistent structures could be on disk or, in a multiple node system, on other nodes. For example, in a parallel server configuration, the persistent structures needed for debugging could reside on other servers. Thus, the technique of separately debugging portions of the database prevents the programmer from analyzing data that resides in the persistent structures of the database.

For the foregoing reasons, what is needed is a method of debugging a software program, such as a database system, that is non-intrusive, yet allows for a comprehensive assessment of a failure.

SUMMARY OF THE INVENTION

A method and apparatus for debugging a software program is provided. In one embodiment, the method comprises preserving a first memory state of a software program, such as a database system at the time just before failure occurs. A second memory state of the software program is also preserved after failure occurs. The failure analysis involves comparing the first memory state with the second memory state.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
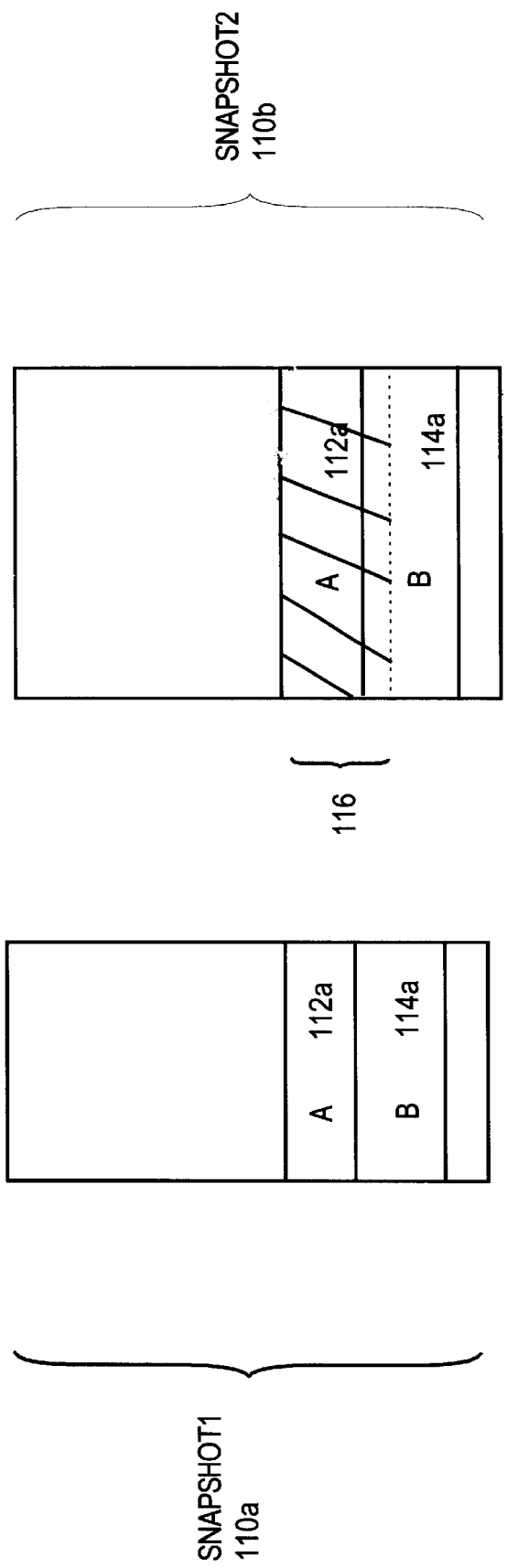
FIG. 1 is a block diagram that illustrates two consecutive snapshots.

Techniques for non-intrusive debugging of a software program are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Consecutive Snapsots

When an error occurs in the database system, a user of the database system may notify the database administrator of the error. Typically, the user has not captured enough information about the error to determine the cause of the error. Accordingly, techniques are provided to allow the database administrator to capture additional information to determine the cause of the error by reproducing the error and taking consecutive snapshots of a group of shared memory structures that contain data and control information for the database instance. The group of shared memory structures that contain data and control information for the database instance is herein referred to as a system global area ("SGA").

Specifically, in the course of reproducing the error, a first snapshot of the SGA is taken at a time immediately preceding the occurrence of the error in database system. For example, if the error originally occurred after a user had issued a particular command in a specific sequence of commands to the database server, then the first snapshot can be taken after issuing the commands that preceded that particular command, but prior to issuing the particular command.

A second snapshot of the SGA is taken after the error has occurred. For example, the second snapshot can be taken immediately after issuing the particular command that nitially caused the error. In certain embodiments, the snapshots of the SGA may be erformed by using various techniques to "flash-freeze" the SGA of the database server. One such technique is described in U.S. patent application Ser. No. 09/223,660 entitled "METHOD AND SYSTEM FOR DIAGNOSTIC PRESERVATION OF THE STATE OF A COMPUTER SYSTEM" filed by Wei Hu and Juan Loaiza on Dec. 30, 1998, the contents of which is incorporated herein by reference. The flash-freeze technique allows for the database system to be temporarily frozen in order to make a copy of the frozen SGA. Once the frozen SGA is copied, the flash-freeze technique provides for the "unfreezing" of the database system and the SGA to allow the database server to run its normal course.

Using the flash-freeze technique, the database system can be temporarily frozen prior to issuing that initially caused the error. A first snapshot of the frozen system is stored. The database system is then unfrozen. The command that causes the error is issued to the database server. As soon as the error is produced, the flash-freeze technique once again temporarily freezes the database system and another copy of the frozen SGA is made. The two snapshots, i.e., the two copies of the frozen SGAs, may then be compared to identify the problem. For example, a comparison of the two snapshots may involve using a simple "DIFF" user command for UNIX operating systems. The DIFF command compares two files and highlights the differences in the two files that are being compared. By using the DIFF command on the two consecutive snapshots, the highlighted areas in the second snapshot would indicate the areas in the SGA that are affected by the error. The highlighted differences may be mapped to corresponding binary and image files to determine the address locations of the affected areas and thus identify the specific data structures that are affected.

For the purpose of illustration, assume that a user issues a SQL command that causes a data structure in the SGA, Matrix A, of size 4×4 to be modified. Further assume that the memory location of Matrix B is adjacent to the memory location of Matrix A. FIG. 1 is a block diagram that illustrates two consecutive snapshots, snapshot 110a, snapshot2 110b of the SGA. In both snaphot 110a and snapshot2 110b, the memory ranges 112a and 114a are associated with Matrix A and Matrix B respectively. Assume that the user erroneously causes data for a size 4×6 matrix to be written to Matrix A, which in turn causes part of the memory of adjacent Matrix B in the SGA to be over-written with some of the data that was supposed to be written to Matrix A. In snaphot2 110b, memory range 116 indicates that part of Matrix B's memory is being over-written. Assume that the over-writing of the memory range allocated to Matrix B causes a fatal exception and the database system crashes. A first snapshot of the SGA is taken just before the SQL command that causes modification of Matrix A is issued, and a second snapshot of the SGA is taken after the SQL command that causes modification of Matrix A is executed. By using the DIFF command on the two consecutive snapshots, it can be quickly determined that the memory allocated to Matrix B was over-written in the course of attempting to modify Matrix A.

Event Based Flash-Frezee

Although a user may not initially have enough information about an error to determine the cause of an error, the user is usually able to provide the series of user actions and user commands such as SQL commands that lead to the occurrence of the error in the database system. From the series of user commands and actions, the database administrator may determine the user command or action that immediately precedes the occurrence of the error. For example, assume that the user command that immediately precedes the occurrence of the error is Command_X. Thus, the database administrator may preserve the first snapshot of the database system by giving the software program an explicit "freeze" guser command before executing Command_X. The database administrator then preserves the second snapshot of the database by giving the software rogram another explicit "freeze" user command after executing Command_X.

Alternatively, the act of preserving the database may be initiated in response to an utomatic trigger that fires when an error event is detected. The act of automatically preserving a snapshot of the database by flash-freezing the database in response to an event is herein referred to as an "event-based flash-freeze". For example, assume that the execution of Command_X causes an internal error message, ERRx_600, to be produced. The execution of Command_X is referred to as a first event and the occurrence of the internal error message, ERRx_600, is the second event. A first automatic trigger may be set to fire in order to flash-freeze the database system when the first event occurs and a second automatic trigger is set to fire when the second event occurs.

Harware Overview

Figure 2:
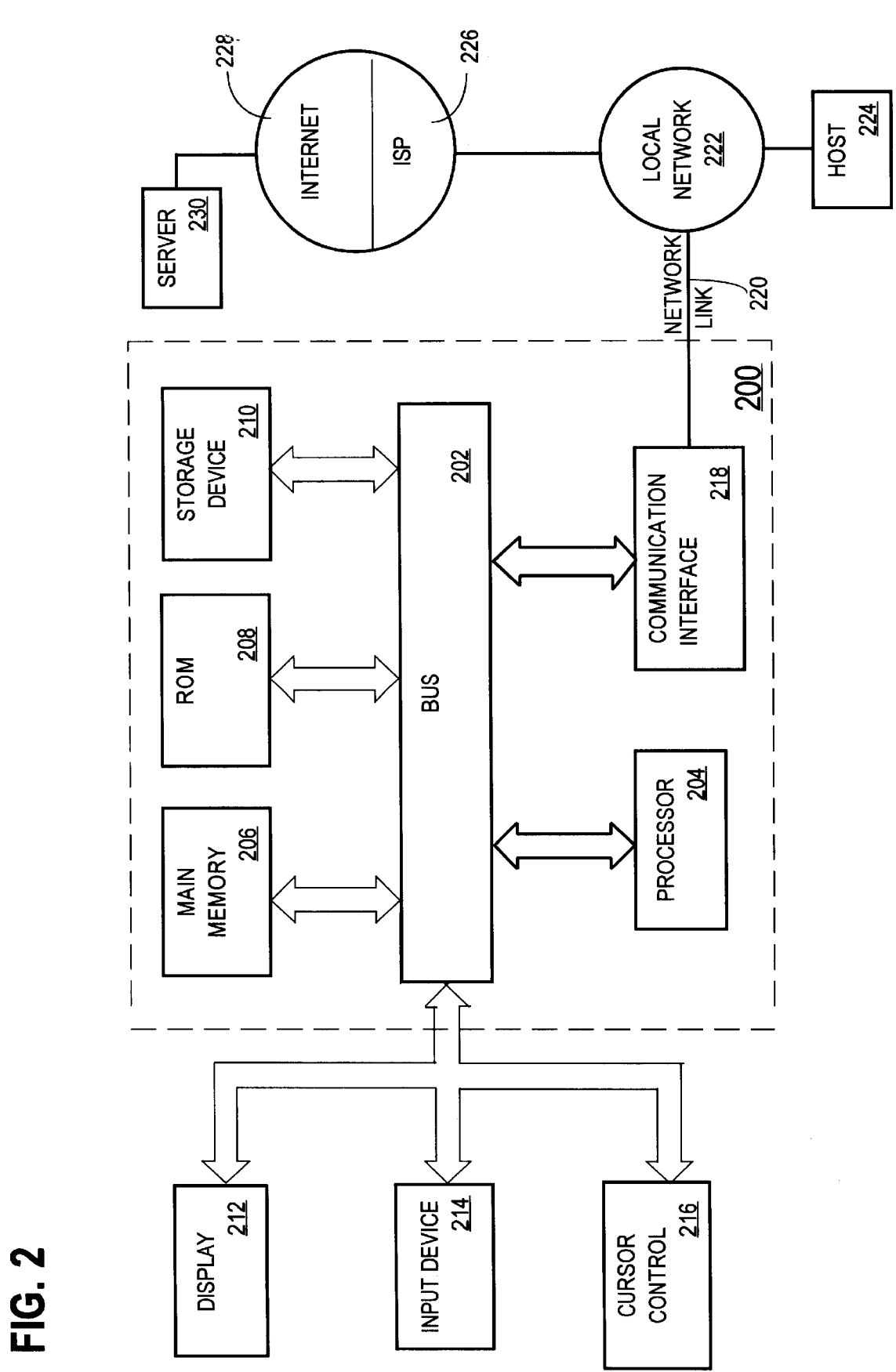
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of debugging a database system, the method comprising the steps of:
   preserving a first snapshot of a group of shared memory structures that contain data and control information of the database system in response to a first event;
   preserving a second snapshot of the group of shared memory structures that contain data and control information of the database system in response to a second event;
   comparing the first snapshot with the second snapshot to determine where changes occurred in said shared memory structures between said first event and said second event; and
   debugging said database system based on where changes occurred in said shared memory structures between said first event and said second event.

2. The method of claim 1 further comprising the steps of:
   comparing the first snapshot with the second snapshot to obtain a snapshot-difference; and
   mapping the snapshot-difference to a binary file corresponding to the database system to obtain memory address locations corresponding to the snapshot-difference.

3. The method of claim 1, wherein the first event is an external error in a failed application of the database system.

4. The method of claim 1, wherein the first event is a prior event that occurs immediately prior to an internal error occurrence in a failed application of the database system.

5. The method of claim 1, wherein the second event is an internal error occurrence in a failed application of the database system.

6. The method of claim 1, wherein an internal error previously occurred in response to executing an erroneous user command in a series of user commands; and
   the method further comprises the steps of
      issuing all user commands in the series of user commands that precede the erroneous user command prior to preserving the first snapshot;
      issuing the erroneous user command after preserving the first snapshot; and preserving the second snapshot in response to the internal error.

7. A computer-readable medium bearing instructions for debugging a database system the instructions arranged, when executed by one or more processors, to cause the one or more processors to perform the steps of:
   preserving a first snapshot of a group of shared memory structures that contain data and control information of the database system in response to a first event;
   preserving a second snapshot of the group of shared memory structures that contain data and control information of the database system in response to a second event;
   comparing the first snapshot with the second snapshot to determine where changes occurred in said shared memory structures between said first event and said second event; and
   debugging said database system based on where changes occurred in said shared memory structures between said first event and said second event.

8. The computer-readable medium of claim 7 further comprising the steps of:
   comparing the first snapshot with the second snapshot to obtain a snapshot-difference; and
   mapping the snapshot-difference to a binary file corresponding to the database system to obtain memory address locations corresponding to the snapshot-difference.

9. The computer-readable medium of claim 7, wherein the first event is an external error in a failed application of the database system.

10. The computer-readable medium of claim 7, wherein the first event is a prior event that occurs immediately prior to an internal error occurrence in a failed application of the database system.

11. The computer-readable medium of claim 7, wherein the second event is an internal error occurrence in a failed application of the database system.

12. The computer-readable medium of claim 7, wherein an internal error previously occurred in response to executing an erroneous user command in a series of user commands; and the method further comprises the steps of issuing all user commands in the series of user commands that precede the erroneous user command prior to preserving the first snapshot;

issuing the erroneous user command after preserving the first snapshot; and preserving the second snapshot in response to the internal error.

13. An apparatus comprising a memory carrying instructions for debugging a database system the instructions arranged, when executed by one or more processors, to cause the one or more processors to perform the steps of:

preserving a first snapshot of a group of shared memory structures that contain data and control information of the database system in response to a first event;

preserving a second snapshot of the group of shared memory structures that contain data and control information of the database system in response to a second event;

comparing the first snapshot with the second snapshot to determine where changes occurred in said shared memory structures between said first event and said second event; and debugging said database system based on where changes occurred in said shared memory structures between said first event and said second event.

14. The apparatus of claim 13, further comprising the steps of:

comparing the first snapshot with the second snapshot to obtain a snapshot-difference; and mapping the snapshot-difference to a binary file corresponding to the database system to obtain memory address locations corresponding to the snapshot-difference.

15. The apparatus of claim 13, wherein the first event is an external error in a failed application of the database system.

16. The apparatus of claim 13, wherein the first event is a prior event that occurs immediately prior to an internal error occurrence in a failed application of the database system.

17. The apparatus of claim 13, wherein the second event is an internal error occurrence in a failed application of the database system.

18. The apparatus of claim 13, wherein an internal error previously occurred in response to executing an erroneous user command in a series of user commands; and the method further comprises the steps of issuing all user commands in the series of user commands that precede the erroneous user command prior to preserving the first snapshot;

issuing the erroneous user command after preserving the first snapshot; and preserving the second snapshot in response to the internal error.

* * * * *

UNITED STATES PATENT AND TRADEMARK OFFICE
CERTIFICATE OF CORRECTION

PATENT NO. : 6,745,344 B1
DATED : June 1, 2004
INVENTOR(S) : Vikram Joshi et al.

Page 1 of 1

It is certified that error appears in the above-identified patent and that said Letters Patent is hereby corrected as shown below:

Title page,
Item [56], References Cited, U.S. PATENT DOCUMENTS, please add the following references:

| | | |
|---|---|---|
| -- 5,437,027, | Bannon, | 07-25-1995 |
| 5,613,098, | Landau et al., | 03-18-1997 |
| 5,781,776, | Johnston et al., | 07-14-1998 |
| 6,003,143, | Kim et al., | 12-14-1999 |
| 6,167,535, | Foote et al., | 12-26-2000 |
| 6,216,237, | Klemm et al., | 04-10-2001 |
| 6,263,491, | Hunt, | 07-17-2001 |
| 6,330,670, | England et al., | 12-11-2001 |
| 6,463,578, | Johnson, | 10-08-2002 |
| 5,675,803, | Preisler et al., | 10-07-1997 |
| 5,946,689, | Yanaka et al., | 08-31-1999 |
| 5,950,198, | Falls et al., | 09-07-1999 |
| 6,029,178, | Martin et al., | 02-22-2000 |
| 6,112,025, | Mulchandani et al., | 08-29-2000 |
| 6,374,268, | Testardi, | 04-16-2002 |
| 6,397,125, | Goldring et al., | 05-28-2002 |
| 6,490,721, | Gorshkov et al., | 12-03-2002 |
| 2003/0004952, | Nixon et al., | 01-02-2003 |
| 5,129,082, | Tirfing et al., | 07-07-1992 |
| 5,197,005, | Shwartz et al., | 03-23-1993 |
| 5,561,763, | Eto et al:, | 10-01-1996 |
| 5,854,924, | Rickel et al., | 12-29-1998 |
| 5,974,418, | Blinn et al., | 10-26-1999 |
| 6,108,659, | Vincent, | 08-22-2000 -- |

Signed and Sealed this

Fourteenth Day of December, 2004

JON W. DUDAS
*Director of the United States Patent and Trademark Office*